United States Patent [19]

Anglin et al.

[11] Patent Number: 4,542,056
[45] Date of Patent: Sep. 17, 1985

[54] COMPOSITE STRUCTURE HAVING CONDUCTIVE SURFACES

[75] Inventors: Jeanne M. Anglin, Kent; Richard R. Edwards, Bellevue; John E. Thomas, Kent, all of Wash.

[73] Assignee: The Boeing Company, Seattle, Wash.

[21] Appl. No.: 532,324

[22] Filed: Sep. 15, 1983

Related U.S. Application Data

[63] Continuation-in-part of Ser. No. 526,838, Aug. 26, 1983.

[51] Int. Cl.$^4$ .......................... B32B 3/12; B64C 1/00
[52] U.S. Cl. ................................ 428/116; 244/117 R;
244/133; 361/218; 428/73; 428/257; 428/285;
428/288; 428/922
[58] Field of Search ................. 428/73, 116, 257, 259,
428/285, 288, 913, 922, 251; 139/425 R;
361/218; 244/117 R, 123, 125, 126, 133, 136;
264/257

[56] References Cited

U.S. PATENT DOCUMENTS

| 3,145,000 | 8/1964 | Mackie | 428/73 |
| 4,081,581 | 3/1978 | Littel | 428/137 |
| 4,312,913 | 1/1982 | Rheaume | 139/425 R |

FOREIGN PATENT DOCUMENTS 2413654 9/1975 Fed. Rep. of Germany ...... 428/922

Primary Examiner—Paul J. Thibodeau
Attorney, Agent, or Firm—Conrad O. Gardner; Bernard A. Donahue; Nicolaas DeVogel

[57] ABSTRACT

A fiberglass fabric wherein a selected number and pattern of yarns have been coated with an aluminum coating is preimpregnated with epoxy or other resin system and laid up as an integral part of a composite structure of the type having a honeycomb core and a plurality of fiberglass plies. Multiple plies of fiberglass fabric which include the yarns coated with an aluminum coating may be utilized in edgeband fastener areas for increased electrical continuity without loss of mechanical strength of composite parts.

3 Claims, 7 Drawing Figures

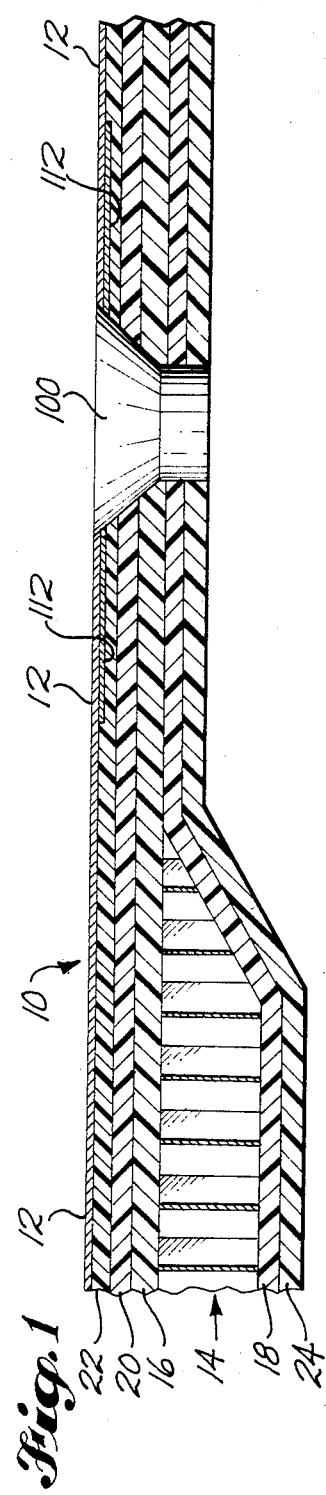
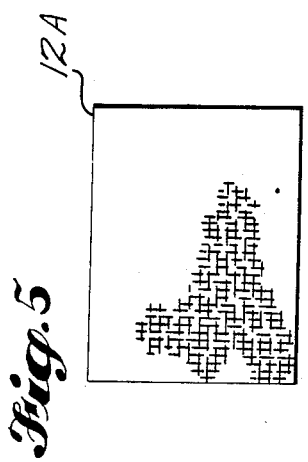
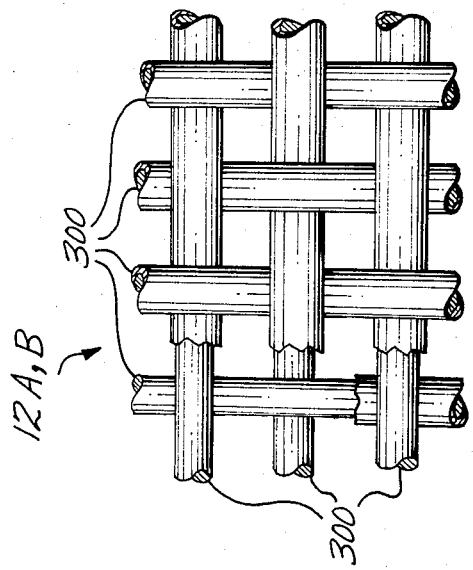
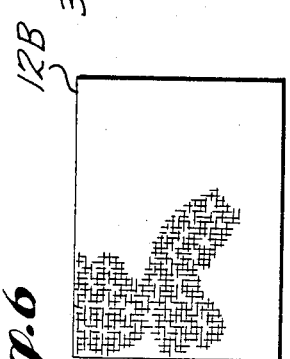

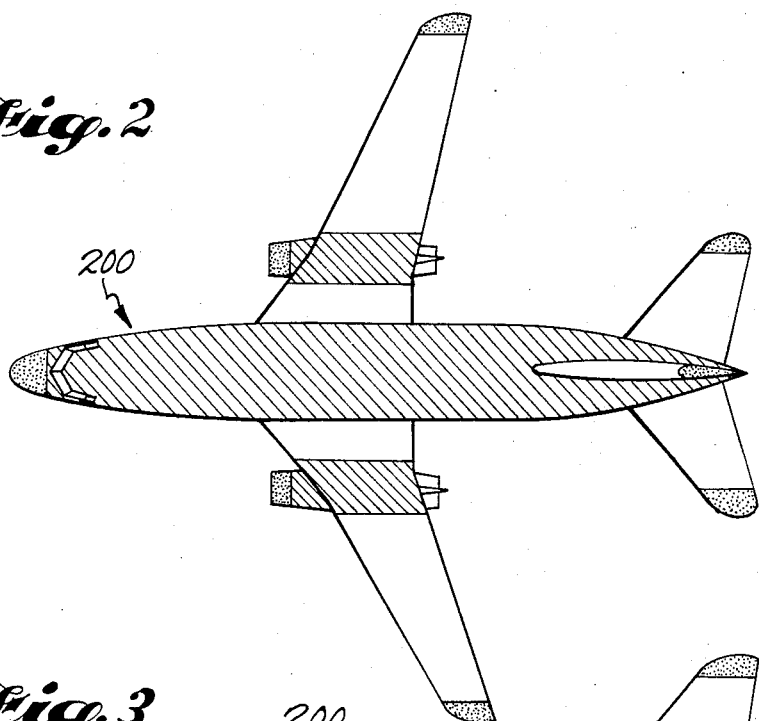
Fig. 2
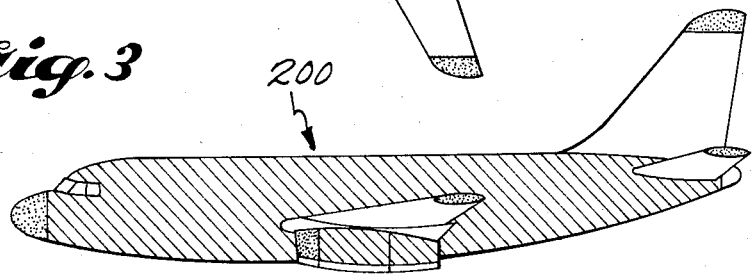
Fig. 3
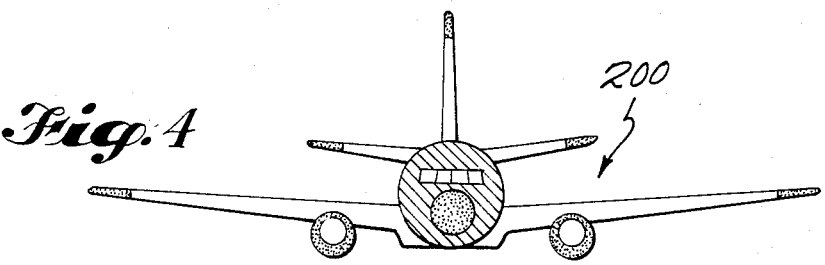
Fig. 4
ZONE 1
ZONE 2
ZONE 3

COMPOSITE STRUCTURE HAVING CONDUCTIVE SURFACES

This application is a continuation-in-part of application Ser. No. 526,838 filed Aug. 26, 1983 and also assigned to The Boeing Company.

The present invention relates to non-metallic aircraft composite structural components and more particularly to a method of providing P-static conductivity, lightning strike protection, electrical shielding capability, and conductivity for antenna ground plane usage on non-metallic aircraft composite structures without requiring secondary conductive coatings.

Illustrative in the prior art patent literature in U.S. Pat. Nos. 3,986,530; 3,631,298; 4,034,375; and 4,211,263 is the basic concept of metallizing non-conductive fibers and interweaving such fibers with nonconductive fibers to provide a yarn. Also, the patent literature, as illustrated in U.S. Pat. No. 3,986,530, shows the anti-static characteristics of such types of yarns.

In contrast, a preferred embodiment of the present invention utilizes a fabric of selectively metallized yarns which is utilized in the manufacture of a composite part for lightning protection and other conductivity requirements.

Currently, non-metallic aircraft composite parts, viz. fiberglass reinforced plastic parts, as utilized in wing-to-body fairing panels, fixed wing leading and trailing edge panels, and trailing edge control surfaces include either a flame sprayed aluminum coating or carbon-filled conductive paint film applied to such structures for required surface conductivity.

It is, accordingly, an object of the present invention to provide composite part structures which include a fiberglass fabric having a selected number and pattern of yarns coated with an aluminum coating which selected number may be adjusted to provide predetermined conductivity characteristics of the fabric.

It is a further object of the present invention to provide composite aircraft structures having electrically conductive surface portions without need of increased weight and costly flame sprayed aluminum or paint coatings.

It is yet another object of the present invention to provide a conductive fiberglass fabric which is preimpregnated with epoxy or other resin system and laid up as an integaral part in the process of manufacture of an aircraft composite structure.

A full understanding of the invention, and of its further objects and advantages and the several unique aspects thereof, will be had from the following description when taken in conjunction with the accompanying drawings in which:

FIG. 1 is a cross-sectional view showing typical edgeband construction of a composite structure in accordance with a preferred embodiment of the present invention;

FIG. 2 is a top view of an aircraft showing three lightning attachment zones;

FIG. 3 is a side view of the aircraft shown in FIG. 2 showing Zone 1, Zone 2, and Zone 3 lightning attachment zones;

FIG. 4 is a front view of the aircraft shown in FIGS. 1 and 2 showing the lightning attachment zones;

FIG. 5 is a top view of the fiberglass fabric portion of the composite structure of FIG. 1 suitable for Zone 1 surface regions of the aircraft of FIGS. 2, 3, and 4;

FIG. 6 is a top view of the fiberglass fabric portion of the composite structure of FIG. 1 suitable for Zone 2 surface regions of the aircraft of FIGS. 2, 3, and 4; and, FIG. 7 is an enlarged view of the fiberglass fabric of FIGS. 5 and 6 showing all individual fiberglass strands in both warp and fill directions having an aluminum coating.

Turning now to FIG. 1, there is shown a composite structure 10 having as an integral part, a fiberglass fabric 12 wherein a selected number and pattern of yarns have been coated with an aluminum coating. Fiberglass fabric 12 having a pattern of yarns coated with an aluminum coating is seen in FIG. 1 as the outermost ply of the composite structure which includes a honeycomb core portion 14 sandwiched between outer fiberglass plies 16 and 18. Composite structure 10 includes an additional series of fiberglass plies 20 and 22, intermediate honeycomb core portion 14 and outer fiberglass fabric member 12. The number and pattern of yarns which are coated with an aluminum coating within fiberglass fabric member 12 can be varied to allow precise control of the electrical conductivity properties desired along the surface of the composite part. Utilization of fiberglass fabric member 12 as the outermost ply in the composite aircraft structure 10 is useful for P-static bleed requirements of an outer aircraft surface, or to provide lightning strike protection or for antenna ground plane usage. Fiberglass fabric member 12, if desired to provide electrical shielding for the aircraft composite structure 10, would be utilized as the innermost ply, viz, below ply 24, as seen in FIG. 1.

In the manufacture of composite part 10, fiberglass fabric member 12 is preimpregnated with epoxy or other resin system and laid up as an integral part of a detail in the same manner as the other plies 22, 20, 16, 18 and 24 in the detail. After lay up of the impregnated plies, subsequent curing in an oven or autoclave sets the resins to provide the composite structure 10 shown in FIG. 1. This results in a finished part having the required electrical performance with no loss in mechanical strength and no requirements for additional conductive coatings as done in the prior art referenced hereinabove.

Fiberglass fabric member 12 may comprise, for example, type TEF5 or TEF7, obtainable from Hexcel Corporation of Livermore, Calif. and which comprises a fiberglass fabric having a pattern of yarns coated with an aluminum coating interwoven with the fiberglass strands. The aforementioned fabric, when preimpregnated with an epoxy such as type F155 250° F. curing epoxy resin system, may then be laid up with the other preimpregnated fiberglass plies shown in FIG. 1 and cured in an oven or autoclave at 250° F. to achieve the integral composite part 10 shown. Finished parts may then be given a normal decorative enamel finish with no further application of conductive materials. Multiple plies of fiberglass fabric which have yarns coated with aluminum coating as shown at 12 may be utilized in edgeband fastener areas such as around fastener 100 shown in FIG. 1 and comprising additional fiberglass fabric member 112 having also a select number and pattern of yarns coated with an aluminum coating as fabric member 12. The resulting composite structure 10 shown in FIG. 1 results in a finished part having the required electrical performance with no loss in mechanical strength and no requirements for additional conductive coatings, and having the advantages of controlled conductivity of surfaces through predetermined selections of numbers and patterns of yarns utilized in the fiberglass fabric members such as 12 and 112.

Turning now to FIGS. 2, 3, and 4, it will be noted that the aircraft 200 has a surface area divided into three zones, viz. Zone 1 regions shown dotted, Zone 2 regions shown by slant line, and Zone 3 regions left blank. Each of the aforementioned zone regions has different lightning attachment or transfer characteristics. Zone 1 regions are surfaces of the aircraft 200 for which there is a high probability of initial lightning flash attachment, including e.g. wing tips, stabilizer and fin tips, and forward engine cowls. Zone 2 regions are surfaces of the aircraft 200 across which there is a high probability of a lightning flash being swept by the airflow from a Zone 1 point of initial flash attachment, e.g. fuselage, engine cowling, and wing aft of engine. Zone 3 includes all of aircraft 200 surface areas other than Zone 1 and Zone 2 regions. In Zone 3, there is a low probability of any direct attachment of the lightning flash arc. Zone 3 areas may carry substantial amounts of electric current by conduction between some pair of initial or swept stroke attachment points.

In summary, lightning strike Zones 1 and 2, in effect, describe the intensity of lightning strike usually sustained on that area of the aircraft. More intense primary strikes are encountered in Zone 1, while strikes in Zone 2 are of lesser intensity. On the present aircraft 200, the aforereferenced TEF7 and TEF5 fabrics 12A and 12B shown in FIGS. 5 and 6, respectively, are utilized at 12 of the composite structure of FIG. 1 in Zone 1 and Zone 2 regions, respectively, in order to provide materials of different weights so that minimum electrical requirements can be met in each zone without imposing unnecessary weight penalties on the parts involved. The heavier TEF7 fabric of FIG. 5 contains enough metallized filament to conduct and dissipate a primary lightning strike without sustaining excessive damage to the underlying non-metallic part. This material could be used in all zones, but would be heavier than necessary in Zone 2. Electrical requirements other than lightning strike, as P-static conductivity, can be met with fabrics containing lesser amounts of conductive filament, and can thus be considerably lighter weight.

In FIG. 7 the individual aluminum coated interwoven fiberglass strands 300 of the fabric 12A and 12B of FIGS. 5 and 6 are shown to comprise all the strands running in both the warp and fill directions. The weave style in fabrics 12A and 12B comprises 5-harness satin which provides a smooth surface texture and further provides stability in prepregging and handling in assembly of the composite aircraft structure 10 of FIG. 1. The coating of fiberglass strands 300 comprises 34.5 percent by weight or 32.2 percent by volume of aluminum.

What is claimed is:

1. A conductive composite structural member for use in an aircraft structure comprising in combination:
    a fiberglass honeycomb core having inner and outer fiberglass plies;
    a fiberglass fabric including a plurality of electrically non-conductive fibers having electrically conductive surface portions interwoven with a plurality of electrically non-conductive fibers having electrically conductive surface portions;
    said fiberglass fabric having a 5-harness satin weave; and,
    said fiberglass fabric disposed against a surface portion of said inner or outer fiberglass plies.

2. A conductive composite structural member for use in an aircraft structure comprising in combination:
    a fiberglass honeycomb core having inner and outer fiberglass plies;
    a fiberglass fabric including a plurality of electrically non-conductive fibers having electrically conductive surface portions interwoven with a plurality of electrically non-conductive fibers having electrically conductive surface portions;
    said electrically conductive surface portions comprising about 34.5 percent by weight aluminum; and,
    said fiberglass fabric disposed against a surface portion of said inner or outer fiberglass plies.

3. In an aircraft structure having Zone 1, Zone 2, and Zone 3 regions, wherein said Zone 1 region comprises surfaces of said aircraft for which there is a high probability of initial lightning flash attachment, said Zone 2 region comprises surface of said aircraft across which there is a high probability of a lightning flash being swept by the airflow from a Zone 1 point of initial flash attachment, and said Zone 3 comprises all remaining surfaces of said aircraft excluding said Zone 1 and Zone 2 regions; said composite structural member comprising in combination:
    a fiberglass honeycomb core having inner and outer fiberglass plies;
    a fiberglass fabric including a plurality of electrically non-conductive fibers having electrically conductive surface portions interwoven with a plurality of electrically non-conductive fibers having electrically conductive surface portions;
    said electrically conductive surface portions extending over Zone 1 and Zone 2 regions of said aircraft surface; and,
    said fiberglass fabric disposed against a surface portion of said inner or outer fiberglass plies.

* * * * *